(12) United States Patent
Hallstead, Sr.

(10) Patent No.: US 6,350,302 B1
(45) Date of Patent: Feb. 26, 2002

(54) AIR FILTRATION SYSTEM

(76) Inventor: Wayne F. Hallstead, Sr., 1029 First Floor Middle, Main Ave., Dickson, PA (US) 18519

( * ) Notice: Subject to any disclaimer, the term of this patent is extended or adjusted under 35 U.S.C. 154(b) by 0 days.

(21) Appl. No.: 09/224,309

(22) Filed: Dec. 31, 1998

(51) Int. Cl.[7] ............................................. B01D 53/14
(52) U.S. Cl. ........................... 96/240; 96/245; 96/252; 96/278; 96/280; 96/361; 96/399; 96/408; 261/125
(58) Field of Search .......................... 96/240, 245, 252, 96/265, 278, 279, 329, 351, 361–363, 249, 250, 280, 408, 399; 261/125

(56) References Cited

U.S. PATENT DOCUMENTS

| | | | |
|---|---|---|---|
| 1,223,082 A | * | 4/1917 | Lissauer |
| 2,164,833 A | * | 7/1939 | Norman |
| 2,392,126 A | * | 1/1946 | Dickinson |
| 2,812,167 A | * | 11/1957 | Wroth |
| 3,282,047 A | * | 11/1966 | Wertheimer |
| 3,520,113 A | * | 7/1970 | Stokes |
| 3,729,900 A | * | 5/1973 | Denning |
| 3,815,332 A | * | 6/1974 | Bobrowsky et al. |
| 3,856,487 A | * | 12/1974 | Perez |
| 4,170,458 A | * | 10/1979 | Hartwick |
| 4,269,612 A | * | 5/1981 | Little |
| 4,676,811 A | * | 6/1987 | Wade |
| 5,143,527 A | * | 9/1992 | Tian-Song |

\* cited by examiner

*Primary Examiner*—David A. Simmons
*Assistant Examiner*—Fred Prince

(57) ABSTRACT

An air filtration system for filtering smoke from the air. The system includes a filter tank for holding a volume of water. A bulkhead wall therein divides the filter tank into first and second compartments and has a hole therethrough to permit passage of water between the first and second compartments of the filter tank. A mesh screen substantially covers the hole of the bulkhead. An air intake conduit is fluidly connected to the first compartment of the filter tank for drawing unfiltered air and debris into the filter tank from a location such as a room. A water supply conduit is fluidly connected to the filter tank for supplying water to the filter tank. A vacuum device is provided for drawing air out of the filter tank. The vacuum device has an intake fluidly connected to the second compartment of the filter tank for drawing air from the filter tank into the vacuum device. The vacuum device has a first return conduit for receiving air drawn into the vacuum device through the intake of the vacuum device. A holding tank is provided for holding water therein. A main drain conduit fluidly connects the filter tank to the holding tank. A sewer drain conduit is fluidly connected to the holding tank to permit passage of water out of the holding tank. A stopper assembly is provided for selectively opening and closing the main drain conduit.

10 Claims, 2 Drawing Sheets

AIR FILTRATION SYSTEM

BACKGROUND OF THE INVENTION

1. Field of the Invention

The present invention relates to air filtration systems and more particularly pertains to a new air filtration system for filtering smoke from the air.

2. Description of the Prior Art

The use of air filtration systems is known in the prior art. More specifically, air filtration systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art air filtration systems include U.S. Pat. No. 5,591,242; U.S. Pat. No. 5,281,246; U.S. Pat. No. 4,177,045; U.S. Pat. No. Des. 377,974; U.S. Pat. No. 3,237,385; and U.S. Pat. No. 3,438,180.

While these devices fulfill their respective, particular objectives and requirements, the aforementioned patents do not disclose a new air filtration system. The inventive device includes a filter tank for holding a volume of water. The filter tank has a bulkhead wall therein dividing the filter tank into first and second compartments. The bulkhead wall has a hole therethrough to permit passage of water between the first and second compartments of the filter tank. A mesh screen substantially covers the hole of the bulkhead, the mesh screen has a plurality of apertures of a predetermined size therethrough to prevent passage therethrough of objects greater than the predetermined size of the apertures of the mesh screen. An air intake conduit is fluidly connected to the first compartment of the filter tank, the air intake conduit is for drawing unfiltered air and debris into the filter tank from a location such as a room. A water supply conduit is fluidly connected to the filter tank. The water supply conduit fluidly connects the filter tank to a water reservoir for supplying water to the filter tank. The water supply conduit has a water control valve for selectively opening and closing the water supply conduit. A vacuum device is provided for drawing air out of the filter tank. The vacuum device has an intake fluidly connected to the second compartment of the filter tank for drawing air from the filter tank into the vacuum device. The vacuum device has a first return conduit for receiving air drawn into the vacuum device through sand intake of the vacuum device, the first return conduit of the vacuum device returning air to the location of the air intake. A holding tank is provided adapted for holding water therein. A main drain conduit fluidly connects the filter tank to the holding tank. The sewer drain conduit is fluidly connected to the holding tank to permit passage of water out of the holding tank. A stopper assembly is provided for selectively opening and closing the main drain conduit.

In these respects, the air filtration system according to the present invention substantially departs from the conventional concepts and designs of the prior art, and in so doing provides an apparatus primarily developed for the purpose of filtering smoke from the air.

SUMMARY OF THE INVENTION

In view of the foregoing disadvantages inherent in the known types of air filtration systems now present in the prior art, the present invention provides a new air filtration system construction wherein the same can be utilized for filtering smoke from the air.

The general purpose of the present invention, which will be described subsequently in greater detail, is to provide a new air filtration system apparatus and method which has many of the advantages of the air filtration systems mentioned heretofore and many novel features that result in a new air filtration system which is not anticipated, rendered obvious, suggested, or even implied by any of the prior art air filtration systems, either alone or in any combination thereof.

To attain this, the present invention generally comprises a filter tank for holding a volume of water. The filter tank has a bulkhead wall therein dividing the filter tank into first and second compartments. The bulkhead wall has a hole therethrough to permit passage of water between the first and second compartments of the filter tank. A mesh screen substantially covers the hole of the bulkhead, the mesh screen has a plurality of apertures of a predetermined size therethrough to prevent passage therethrough of objects greater than the predetermined size of the apertures of the mesh screen. An air intake conduit is fluidly connected to the first compartment of the filter tank, the air intake conduit is for drawing unfiltered air and debris into the filter tank from a location such as a room. A water supply conduit is fluidly connected to the filter tank. The water supply conduit fluidly connects the filter tank to a water reservoir for supplying water to the filter tank. The water supply conduit has a water control valve for selectively opening and closing the water supply conduit. A vacuum device is provided for drawing air out of the filter tank. The vacuum device has an intake fluidly connected to the second compartment of the filter tank for drawing air from the filter tank into the vacuum device. The vacuum device has a first return conduit for receiving air drawn into the vacuum device through sand intake of the vacuum device, the first return conduit of the vacuum device returning air to the location of the air intake. A holding tank is provided adapted for holding water therein. A main drain conduit fluidly connects the filter tank to the holding tank. The sewer drain conduit is fluidly connected to the holding tank to permit passage of water out of the holding tank. A stopper assembly is provided for selectively opening and closing the main drain conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air filtration system apparatus and method which has many of the advantages of the air filtration systems mentioned heretofore and many novel features that result in a new air filtration system which is not anticipated, rendered obvious, suggested, or even implied by any of the prior art air filtration systems, either alone or in any combination thereof.

It is another object of the present invention to provide a new air filtration system which may be easily and efficiently manufactured and marketed.

It is a further object of the present invention to provide a new air filtration system which is of a durable and reliable construction.

An even further object of the present invention is to provide a new air filtration system which is susceptible of a low cost of manufacture with regard to both materials and labor, and which accordingly is then susceptible of low prices of sale to the consuming public, thereby making such air filtration system economically available to the buying public.

Still yet another object of the present invention is to provide a new air filtration system which provides in the apparatuses and methods of the prior art some of the advantages thereof, while simultaneously overcoming some of the disadvantages normally associated therewith.

Still another object of the present invention is to provide a new air filtration system f or filtering smoke from the air.

Yet another object of the present invention is to provide a new air filtration system which includes a filter tank for holding a volume of water. The filter tank has a bulkhead wall therein dividing the filter tank into first and second compartments. The bulkhead wall has a hole therethrough to permit passage of water between the first and second compartments of the filter tank. A mesh screen substantially covers the hole of the bulkhead, the mesh screen has a plurality of apertures of a predetermined size therethrough to prevent passage therethrough of objects greater than the predetermined size of the apertures of the mesh screen. An air intake conduit is fluidly connected to the first compartment of the filter tank, the air intake conduit is for drawing unfiltered air and debris into the filter tank from a location such as a room. A water supply conduit is fluidly connected to the filter tank. The water supply conduit fluidly connects the filter tank to a water reservoir for supplying water to the filter tank. The water supply conduit has a water control valve for selectively opening and closing the water supply conduit. A vacuum device is provided for drawing air out of the filter tank. The vacuum device has an intake fluidly connected to the second compartment of the filter tank for drawing air from the filter tank into the vacuum device. The vacuum device has a first return conduit for receiving air drawn into the vacuum device through sand intake of the vacuum device, the first return conduit of the vacuum device returning air to the location of the air intake. A holding tank is provided adapted for holding water therein. A main drain conduit fluidly connects the filter tank to the holding tank. The sewer drain conduit is fluidly connected to the holding tank to permit passage of water out of the holding tank. A stopper assembly is provided for selectively opening and closing the main drain conduit.

Still yet another object of the present invention is to provide a new air filtration system that also may serve as a trash disposal unit for small size waste such as cigarette butts, spent matches, cigarette package and gum wrappers.

Even still another object of the present invention is to provide a new air filtration system that filters air by passing it through water and a stainless steel filter element.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
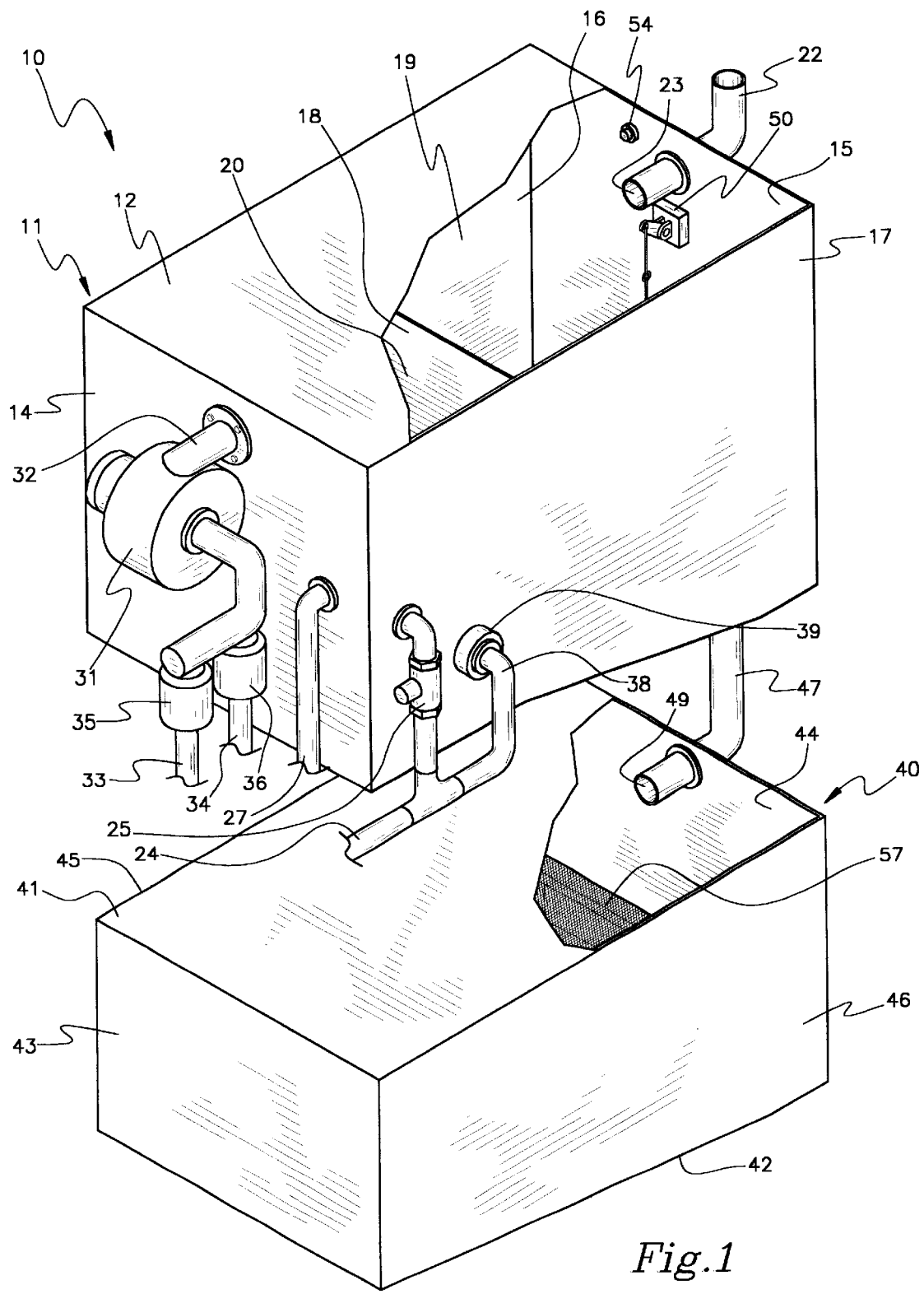
FIG. 1 is a schematic perspective view of a new air filtration system according to the present invention.
Figure 2:
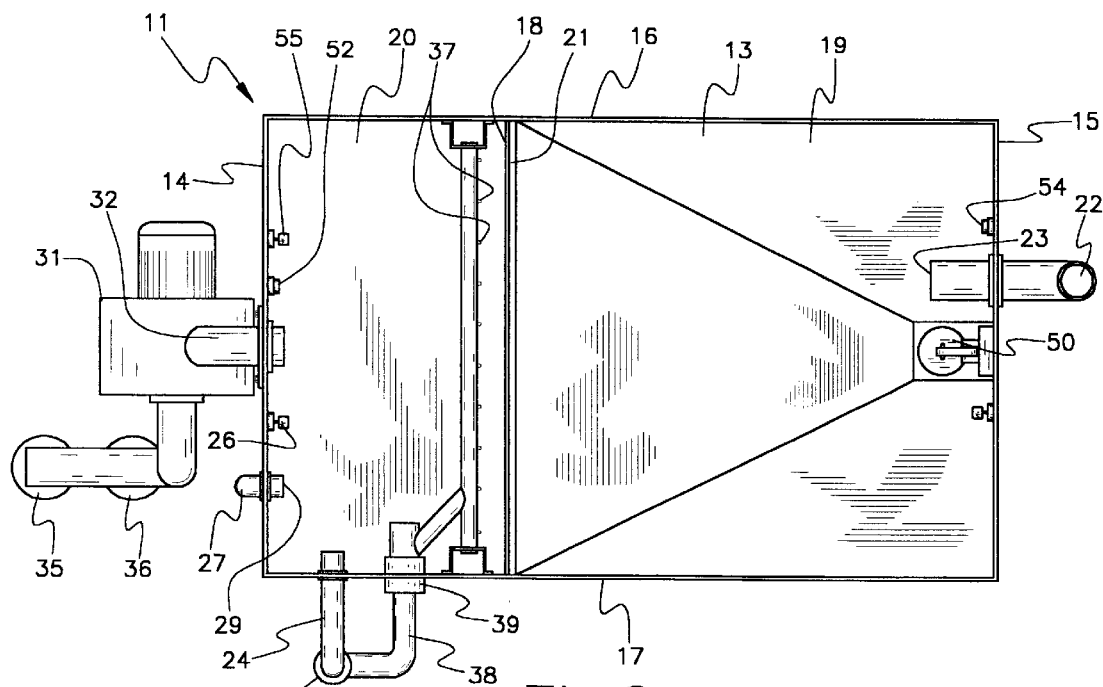
FIG. 2 is a schematic top view filter tank region of the present invention.
Figure 3:
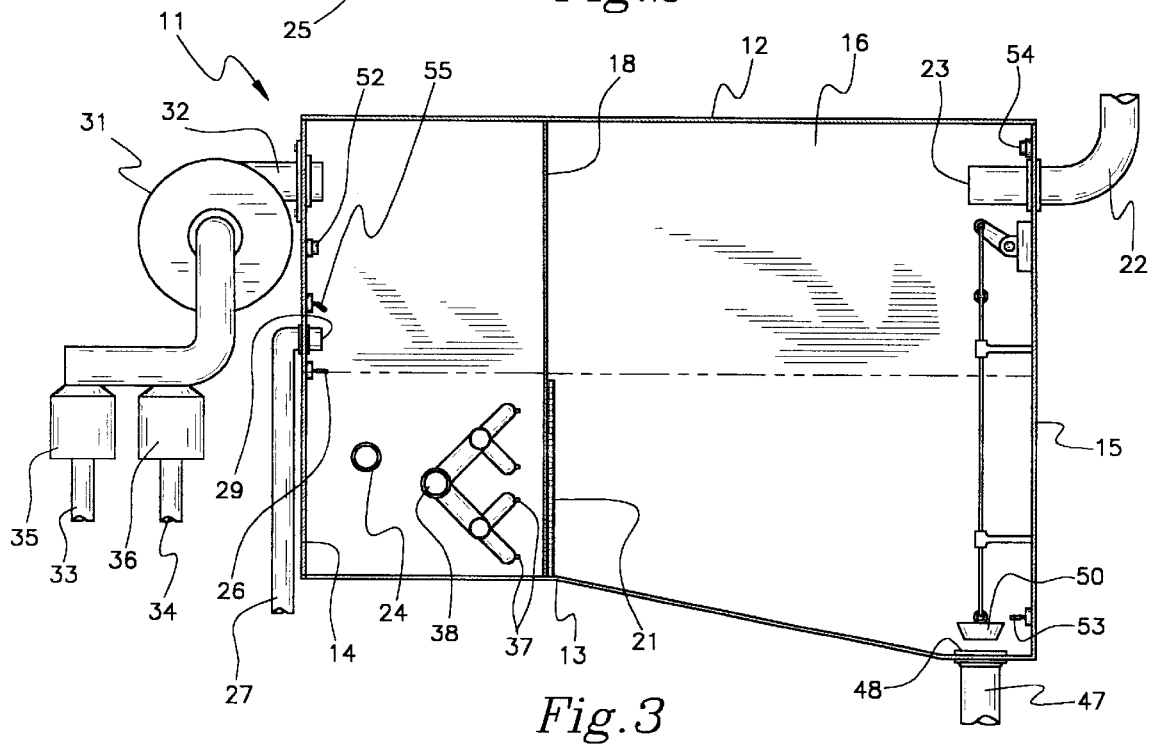
FIG. 3 is a schematic cross sectional view of the filter tank region of the present invention.

With reference now to the drawings, and in particular to FIGS. 1 through 3 thereof, a new air filtration system embodying the principles and concepts of the present invention and generally designated by the reference numeral 10 will be described.

As best illustrated in FIGS. 1 through 3, the air filtration system 10 generally comprises a filter tank for holding a volume of water. The filter tank has a bulkhead wall therein dividing the filter tank into first and second compartments. The bulkhead wall has a hole therethrough to permit passage of water between the first and second compartments of the filter tank. A mesh screen substantially covers the hole of the bulkhead, the mesh screen has a plurality of apertures of a predetermined size therethrough to prevent passage therethrough of objects greater than the predetermined size of the apertures of the mesh screen. An air intake conduit is fluidly connected to the first compartment of the filter tank, the air intake conduit is for drawing unfiltered air and debris into the filter tank from a location such as a room. A water supply conduit is fluidly connected to the filter tank. The water supply conduit fluidly connects the filter tank to a water reservoir for supplying water to the filter tank. The water supply conduit has a water control valve for selectively opening and closing the water supply conduit. A vacuum device is provided for drawing air out of the filter tank. The vacuum device has an intake fluidly connected to the second compartment of the filter tank for drawing air from the filter tank into the vacuum device. The vacuum device has a first return conduit for receiving air drawn into the vacuum device through sand intake of the vacuum device, the first return conduit of the vacuum device returning air to the location of the air intake. A holding tank is provided adapted for holding water therein. A main drain conduit fluidly connects the filter tank to the holding tank. The sewer drain conduit is fluidly connected to the holding tank to permit passage of water out of the holding tank. A stopper assembly is provided for selectively opening and closing the main drain conduit.

In closer detail, the air filtration system 10 comprises a filter tank 11 for holding a volume of water. The filter tank has top and bottom walls 12,13, a pair end walls 14,15, and a pair of side walls 16,17. The filter tank has a bulkhead wall 18 therein dividing the filter tank into first and second compartments 19,20 between the end walls of the filter tank. The bulkhead wall has a hole therethrough to permit passage of water between the first and second compartments of the filter tank. The hole of the bulkhead wall is positioned adjacent the bottom wall of the filter tank. A mesh screen 21 substantially covers the hole of the bulkhead. The mesh screen has a plurality of apertures of a predetermined size therethrough to prevent passage therethrough of objects greater than the predetermined size of the apertures of the mesh screen. Ideally, the mesh screen comprises stainless steel.

An air intake conduit 22 is fluidly connected to the first compartment of the filter tank. In use, the air intake conduit is designed for drawing unfiltered air and debris into the filter tank from a location. The air intake conduit has an open end 23 in the filter tank adjacent the top wall of the filter tank. A water supply conduit 24 is fluidly connected to second compartment the filter tank. The water supply conduit fluidly connects the filter tank to a water reservoir for supplying water to the filter tank. The water supply conduit has a water control valve 25 for selectively opening and closing the water supply conduit. A high water sensor 26 is provided in the second compartment of the filter tank. The high water sensor detects when water in the filter tank reaches a predetermined volume. When the high water sensor detects water in the filter tank reaching the predetermined volume of the high water sensor, the water control valve closes the water supply conduit.

An water overflow drain conduit 27 fluidly connects the filter tank to a sewer drain conduit not shown. The water overflow drain conduit has an open end 29 provided in the second compartment of the filter tank. In use, the water overflow drain conduit permits passage of fluid therein from the filter tank when water in the filter tank is above the predetermined volume of the high water sensor. The water overflow drain conduit has a check valve 30 for preventing flow of water from the sewer drain conduit through the water overflow drain conduit.

A vacuum fan device 31 for drawing air out of the filter tank has an intake 32 fluidly connected to the second compartment of the filter tank for drawing air from the filter tank into the vacuum device. The intake of the vacuum device is positioned towards the top wall of the filter tank. In use, the vacuum device pulls air from the air intake conduit into the first compartment of the filter tank through the mesh screen and into the second compartment of the filter tank and into the intake of the vacuum fan. The vacuum device has a first and second return conduits 33,34 for receiving air drawn into the vacuum device through sand intake of the vacuum device. The first return conduit of the vacuum device returns air to the location of the air intake where air is drawn into the system while the second return conduit of the vacuum device is fluidly connected to the water overflow drain conduit to pass air into from the vacuum device to the water overflow drain conduit. Each of the return conduits of the vacuum device has a filter 35,36 for purifying air passing therethrough. Ideally, the filter of the first return conduit of the vacuum device comprises a iEPA filter and the filter of the second return conduit of the vacuum device comprises a charcoal filter.

A plurality of spray nozzles 37 are provided in the second compartment of the filter tank. The spray nozzles are fluidly connected to the water supply conduit by a conduit 38. The spray nozzles are positioned for spraying water on the mesh screen to spray off debris on the mesh screen. The conduit connecting the spray nozzles to the water supply conduit has a sprayer valve 39 for selectively opening and closing passage of water from the water supply conduit to the spray nozzles.

A holding tank 40 is provided for holding water therein. The holding tank has top and bottom walls 41,42, a pair of end walls 43,44, and a pair side walls 45,46. A main drain conduit 47 fluidly connects the first compartment of the filter tank to the holding tank to permit passage of water and debris from the first compartment to the holding tank. The main drain conduit has a first opening 48 in the bottom wall of the filter tank in the first compartment of the filter tank and a second opening 49 in one of the end walls of the holding tank adjacent the top wall of the holding tank.

The sewer drain conduit is fluidly connected to the holding tank to permit passage of water out of the holding tank. A stopper assembly 50 is provided in the first compartment of the filter tank for selectively opening and closing the main drain conduit. In use, the high water sensor activates the vacuum device to draw air through the filter tank when water in the filter tank reaches the predetermined volume of the high water sensor. The vacuum device has a first sensor 52 provided in the second compartment for detecting when air flow through the mesh screen is below a predetermine air flow rate from blockage by debris closing a number of apertures of the mesh screen. In use, the vacuum device deactivates to stop drawing air therein when air flow is less than the predetermined air flow rate of the first sensor. The stopper assembly opens the main drain conduit when air flow is less than the predetermined air flow rate of the first sensor to permit passage of water from the filter tank into the holding tank.

A low water sensor 53 is provided in the first compartment for detecting when the volume of water in the filter tank is below a predetermined volume. The stopper assembly closes the main drain conduit when the water volume in the filter tank is below the predetermined volume of the low water sensor. The sprayer valve opens for a predetermined amount of time to permit passage of water from the water supply conduit to the spray nozzles to clean the mesh screen of debris when the low water sensor detects a volume of water in the filter tank below the predetermined volume of the lower water sensor. Ideally, the predetermined amount of time of the sprayer valve is between about 1 minute and about 2 minutes.

The vacuum device has second and third sensors for detecting when air flow through the air intake conduit is below a predetermined air flow rate due to blockage in the air intake conduit. The second sensor 54 is located in the first compartment of the filter tank while the third sensor is located in the location where air is drawn in from by the air intake conduit. In use, the vacuum device deactivates to stop drawing air therein when air flow is less than the predetermined air flow rate of the second and third sensors.

The filter tank also has a first high water shut down sensor 55 for detecting when water in the filter tank reaches a predetermined volume greater than the predetermined volume of the high water sensor. In use, the water control valve closes and the vacuum device deactivates when water in the filter tank is greater than the predetermined volume of the first high water shut down sensor. The holding tank also has a second high water shut down sensor 56 for detecting when water in the holding tank reaches a predetermined volume. In use, the water control valve closes and the vacuum device deactivates when water in the holding tank is greater than the predetermined volume of the second high water shut down sensor.

A screen floor 57 is provided in the holding tank for preventing passage of debris greater than a predetermined size into the sewer drain conduit. The holding tank has a weight sensor 58 for detecting when accumulated debris on the screen floor reaches a predetermined amount of weight. When the weight of accumulated debris on the screen floor is greater than the predetermined weight of the weight sensor, the water control valve closes and the vacuum device deactivates.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An air filtration system, comprising:

a filter tank for holding a volume of water;

said filter tank having a bulkhead wall therein dividing said filter tank into first and second compartments, said bulkhead wall having a hole therethrough to permit passage of water between said first and second compartments of said filter tank;

a mesh screen substantially covering said hole of said bulkhead, said mesh screen having a plurality of apertures of a predetermined size therethrough to prevent passage therethrough of objects greater than said predetermined size of said apertures of said mesh screen;

air intake conduit being fluidly connected to said first compartment of said filter tank, said air intake conduit being for drawing unfiltered air and debris into said filter tank from a location;

a water supply conduit being fluidly connected to said filter tank, said water supply conduit fluidly connecting said filter tank to a water reservoir for supplying water to said filter tank;

said water supply conduit having a water control valve for selectively opening and closing said water supply conduit;

a vacuum device for drawing air out of said filter tank, said vacuum device having an intake fluidly connected to said second compartment of said filter tank for drawing air from said filter tank into said vacuum device;

said vacuum device having a first return conduit for receiving air drawn into said vacuum device through said intake of said vacuum device, said first return conduit of said vacuum device returning air to the location of the air intake;

a holding tank adapted for holding water therein;

a main drain conduit fluidly connecting said filter tank to said holding tank; a sewer drain conduit being fluidly connected to said holding tank to permit passage of water out of said holding tank; and a stopper assembly for selectively opening and closing said main drain conduit.

2. The system of claim 1, further comprising a high water sensor for detecting when water in said filter tank reaches a predetermined volume, said water control valve closing said water supply conduit when said high water sensor detects water in the filter tank reaching the predetermined volume of the high water sensor, said high water sensor being provided in said second compartment of said filter tank.

3. The system of claim 1, further comprising an water overflow drain conduit, said water overflow drain conduit having an open end provided in said second compartment of said filter tank, said water overflow drain conduit permitting passage of fluid therein from said filter tank when water in said filter tank is above said predetermined volume of said high water sensor.

4. The system of claim 3, wherein said water overflow drain conduit has a check valve for preventing flow of water through said water overflow drain conduit.

5. The system of claim 1, wherein said vacuum device has a second return conduit for receiving air drawn into said vacuum device through said intake of said vacuum device, said second return conduit of said vacuum device being fluidly connected to said water overflow drain conduit.

6. The system of claim 1, further comprising a plurality of spray nozzles being provided in said second compartment of said filter tank, said spray nozzles being fluidly connected to said water supply conduit, said spray nozzles being positioned for spraying water on said mesh screen.

7. The system of claim 1, wherein said vacuum device has a first sensor for detecting when air flow through said mesh screen is below a predetermine air flow rate, said first sensor being provided in said second compartment, said vacuum device deactivating to stop drawing air therein when air flow is less than said predetermined air flow rate of said first sensor.

8. The system of claim 7, wherein said stopper assembly opens said main drain conduit when air flow is less than said predetermined air flow rate of said first sensor to permit passage of water from said filter tank into said holding tank.

9. The system of claim 8, further comprising a low water sensor for detecting when the volume of water in said filter tank is below a predetermined volume, said stopper assembly closing said main drain conduit when the water volume in said filter tank is below said predetermined volume of said low water sensor, said lower water sensor being provided in said first compartment.

10. An air filtration system, comprising:

a filter tank for holding a volume of water, said filter tank having top, bottom and a pair end walls, and a pair of side walls;

said filter tank having a bulkhead wall therein dividing said filter tank into first and second compartments between said end walls of said filter tank, said bulkhead wall having a hole therethrough to permit passage of water between said first and second compartments of said filter tank, said hole of said bulkhead wall being positioned adjacent said bottom wall of said filter tank;

a mesh screen substantially covering said hole of said bulkhead, said mesh screen having a plurality of apertures of a predetermined size therethrough to prevent passage therethrough of objects greater than said predetermined size of said apertures of said mesh screen, wherein said mesh screen comprises stainless steel;

air intake conduit being fluidly connected to said first compartment of said filter tank, said air intake conduit being for drawing unfiltered air and debris into said filter tank from a location, said air intake conduit having an open end in said filter tank adjacent said top wall of said filter tank;

a water supply conduit being fluidly connected to second compartment said filter tank, said water supply conduit fluidly connecting said filter tank to a water reservoir for supplying water to said filter tank;

said water supply conduit having a water control valve for selectively opening and closing said water supply conduit;

a high water sensor for detecting when water in said filter tank reaches a predetermined volume, said water control valve closing said water supply conduit when said high water sensor detects water in the filter tank reaching the predetermined volume of the high water sensor, said high water sensor being provided in said second compartment of said filter tank;

an water overflow drain conduit, said water overflow drain conduit having an open end provided in said second compartment of said filter tank, said water overflow drain conduit permitting passage of fluid therein from said filter tank when water in said filter tank is above said predetermined volume of said high water sensor;

said water overflow drain conduit having a check valve for preventing flow of water through said water overflow drain conduit;

a vacuum device for drawing air out of said filter tank, said vacuum device having an intake fluidly connected to said second compartment of said filter tank for drawing air from said filter tank into said vacuum device, said intake of said vacuum device being positioned towards said top wall of said filter tank;

said vacuum device having a first and second return conduits for receiving air drawn into said vacuum device through said intake of said vacuum device, said first return conduit of said vacuum device returning air to the location of the air intake, said second return conduit of said vacuum device being fluidly connected to said water overflow drain conduit;

each of said return conduits of said vacuum device having a filter for purifying air passing therethrough, wherein said filter of said first return conduit of said vacuum device comprises a HEPA filter, wherein said filter of said second return conduit of said vacuum device comprises a charcoal filter;

a plurality of spray nozzles being provided in said second compartment of said filter tank, said spray nozzles being fluidly connected to said water supply conduit, said spray nozzles being positioned for spraying water on said mesh screen;

a sprayer valve for selectively opening and closing passage of water from said water supply conduit to said spray nozzles;

a holding tank adapted for holding water therein, said holding tank having top and bottom walls, a pair of end walls, and a pair side walls;

a main drain conduit fluidly connecting said first compartment of said filter tank to said holding tank, said main drain conduit having a first opening in said bottom wall of said filter tank in said first compartment of said filter tank and a second opening in one of said end walls of said holding tank adjacent said top wall of said holding tank;

a stopper assembly for selectively opening and closing said main drain conduit, said stopper assembly being provided in said first compartment of said filter tank;

said high water sensor activating said vacuum device to draw air through said filter tank when water in said filter tank reaches said predetermined volume of said high water sensor;

said vacuum device having a first sensor for detecting when air flow through said mesh screen is below a predetermine air flow rate, said first sensor being provided in said second compartment;

said vacuum device deactivating to stop drawing air therein when air flow is less than said predetermined air flow rate of said first sensor;

said stopper assembly opening said main drain conduit when air flow is less than said predetermined air flow rate of said first sensor to permit passage of water from said filter tank into said holding tank;

a low water sensor for detecting when the volume of water in said filter tank is below a predetermined volume, said stopper assembly closing said main drain conduit when the water volume in said filter tank is below said predetermined volume of said low water sensor, said lower water sensor being provided in said first compartment;

said sprayer valve opening for a predetermined amount of time to permit passage of water from said water supply conduit to said spray nozzles when said low water sensor detects a volume of water in said filter tank below said predetermined volume of said lower water sensor, wherein said predetermined amount of time of said sprayer valve is between about 1 minute and about 2 minutes;

said vacuum device having second and third sensors for detecting when air flow through said air intake conduit is below a predetermined air flow rate, said second sensor being located in said first compartment of said filter tank, said third sensor being located in the location;

said vacuum device deactivating to stop drawing air therein when air flow is less than said predetermined air flow rate of said second and third sensors;

said filter tank having a first high water shut down sensor for detecting when water in said filter tank reaches a predetermined volume greater than said predetermined volume of said high water sensor, said water control valve closing and said vacuum device deactivating when water in said filter tank is greater than said predetermined volume of said first high water shut down sensor;

said holding tank having a second high water shut down sensor for detecting when water in said holding tank reaches a predetermined volume, said water control valve closing and said vacuum device deactivating when water in said holding tank is greater than said predetermined volume of said second high water shut down sensor;

a screen floor being provided in said holding tank for preventing passage of debris greater than a predetermined size into said sewer drain conduit; and said holding tank having a weight sensor for detecting when accumulated debris on said screen floor reaches a predetermined amount of weight, said water control valve closing and said vacuum device deactivating when said weight of accumulated debris on said screen floor is greater than said predetermined weight of said weight sensor.

* * * * *